No. 654,592. Patented July 31, 1900.
W. H. BARR.
FILTERING APPARATUS.
(No Model.) 2 Sheets—Sheet 1.
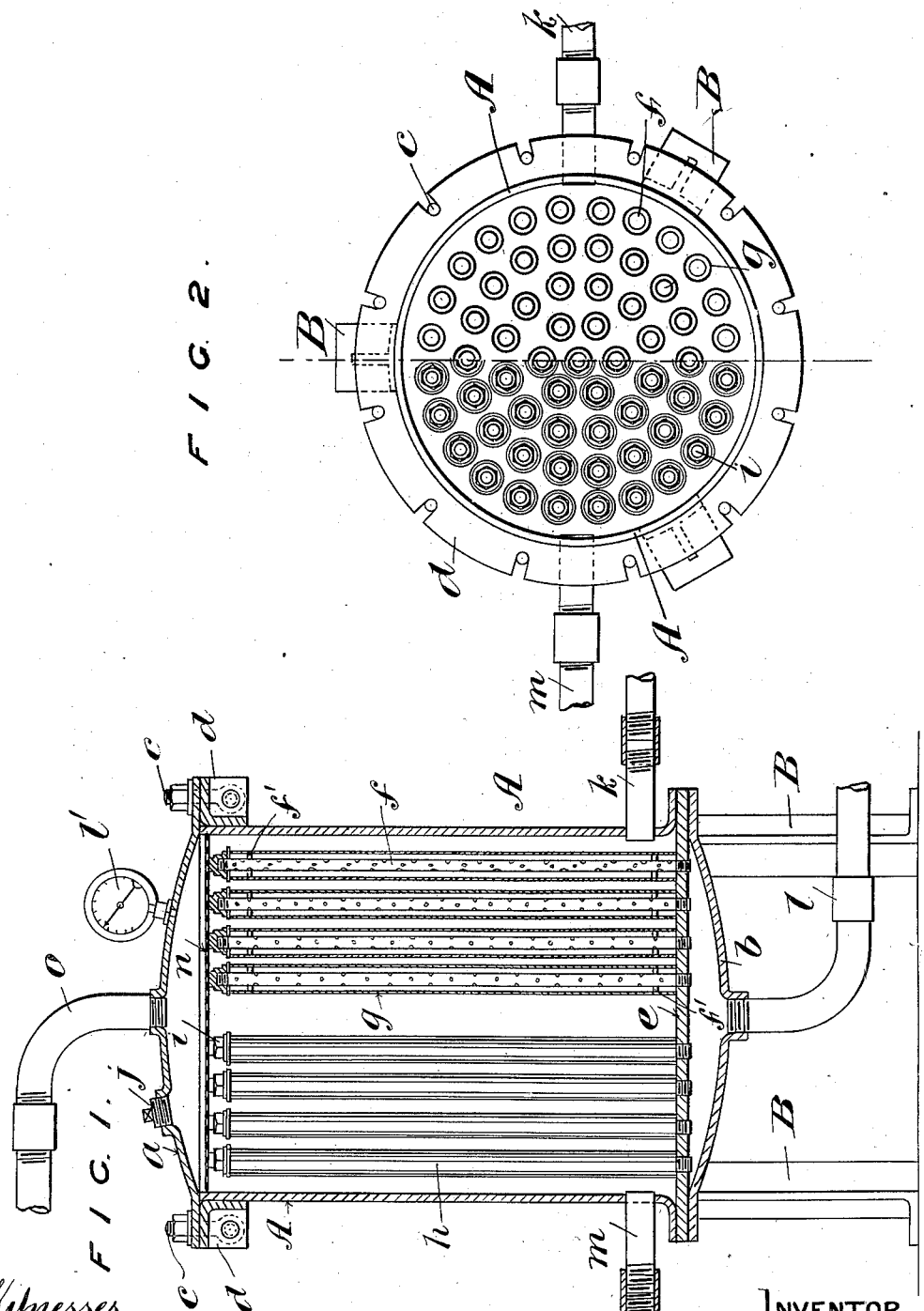
Witnesses
Ella L. Giles
INVENTOR
William Henry Barr
By his atty. Richards & Co No. 654,592. Patented July 31, 1900.
W. H. BARR.
FILTERING APPARATUS.
(No Model.) 2 Sheets—Sheet 2.
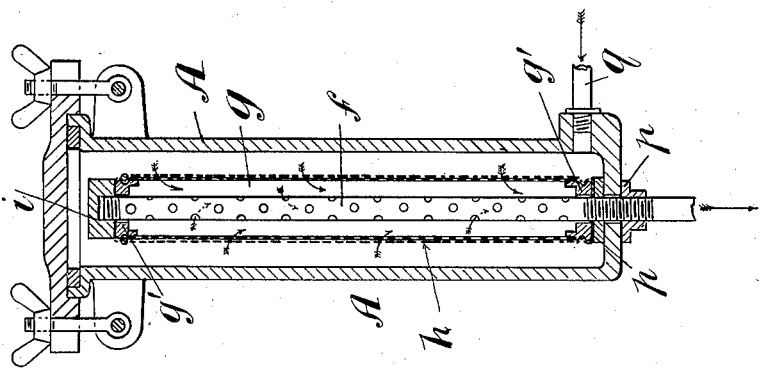
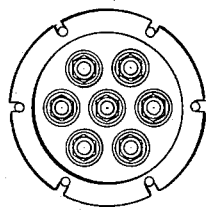
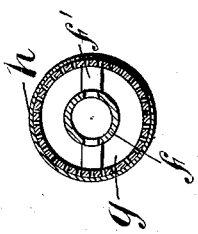
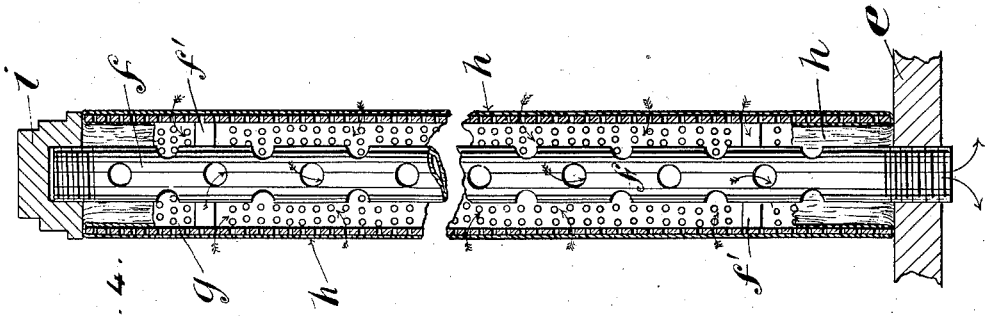
INVENTOR
William Henry Barr
By his Atty. Richards & Co.

UNITED STATES PATENT OFFICE.

WILLIAM HENRY BARR, OF BURY, ENGLAND.

FILTERING APPARATUS.

SPECIFICATION forming part of Letters Patent No. 654,592, dated July 31, 1900.

Application filed January 23, 1900. Serial No. 2,502. (No model.)

*To all whom it may concern:*

Be it known that I, WILLIAM HENRY BARR, Fellow of the Chemical Society, a subject of the Queen of Great Britain and Ireland, residing at Belgrave Place, Bury, in the county of Lancaster, England, have invented certain new and useful Improvements in Apparatus for the Filtration and Purification of Water, Spirits, Beer, Steam, and other Fluids, (for which I have made application for patent in Great Britain, No. 13,128, dated June 24, 1899,) of which the following is a specification.

My said invention relates to an improved apparatus for use in the filtration of water, beer, spirits, and other fluids.

The accompanying two sheets of drawings clearly illustrate my invention.

Figure 1 shows in sectional elevation a filter-casing carrying a number of filter beds or units. Fig. 2 is a plan thereof with the cover removed, one-half of the filter-beds being shown in cross-section. Fig. 3 is a plan view of the interior arrangement of a small filter. Fig. 4 is a sectional elevation, on an enlarged scale, of a filter-bed broken in length for want of space. Fig. 5 is a cross-sectional plan thereof. Fig. 6 shows in sectional elevation a single filtering unit within a suitable casing as adapted for domestic purposes.

Referring in the first place to Figs. 1 to 5, in constructing a filter in accordance with my invention I provide an outer pressure-proof cylindrical casing A, of suitable capacity, carried on a base or support B, but which may be also mounted on wheels or on a carriage for convenience of transport. The casing A is provided with a removable cover $a$ and also with a receiver $b$ for the filtered water, preferably at the bottom of the casing. The cover $a$ is secured by means of hinged bolts $c$, carried by the annular ring or flange $d$. At the bottom of the casing A, I provide a floor $e$, forming a roof to the receiver $b$, and this is perforated to carry a number of perforated metal tubes $f$, arranged in concentric circles around a central unit, the number of which would vary according to the capacity of the filter-casing and the duty the filter is required to perform. The perforated tubes are screwed to the floor $e$ of the filter-casing A and are expanded in the floor or calked or a fluid-tight connection attained by any other suitable means. The perforated tubes $f$ serve to support filtering-cylinders and also to carry off and conduct the filtered water or other liquid to the receiver. The reader is referred to Fig. 4 for an enlarged detailed construction of the filter-bed. The filtering-cylinders consist of perforated metallic tubes $g$, which may be of aluminium, tinned copper, brass, or other suitable metal. The cylinders $g$ are placed upon the inner supporting-tubes $f$ and an annular space maintained between the two by means of distance-pieces $f'$, secured, top and bottom, to the inner tube $f$, as shown more particularly in the enlarged views, Figs. 4 and 5. The perforated filtering-cylinders $g$ are covered with a cloth straining-jacket $h$, preferably of mercerized cotton cambric. The cotton cambric is mercerized according to the well-known process; but the stretching of the cloth is omitted, so that the shrinkage which ensues causes the cloth to become more homogeneous, the interstices being filled up, and the cloth is thus rendered very suitable as a straining material. The cloth jacket $h$ is of greater length than the tube $g$ and is tucked into the interior of the same, as shown in Fig. 4. A cap-nut $i$, screwed upon the top of the inner tube $h$, beds upon the top of the cloth-covered tube $g$ and jams the tube $g$ tightly upon the floor $e$ of the casing A. The turned-in cloth jacket $h$ serves as a flexible material to provide a fluid-tight joint between the cap-nut $i$ and the cylinder $g$ and as well as at the foot of the cylinder. If desired or requisite, additional resilient washers may be used at these points to effect the object.

Instead of a cap-nut $i$, as illustrated, an ordinary nut may be employed and the top screwed end of the tube $f$ be plugged up. Through a suitable aperture provided in the cover of the casing, closed by a screwed plug $j$, I introduce into the casing A a quantity of filtering-earth, such as agalite, kieselguhr, or other filtering media. The filtering-earths are previously mixed into an emulsion with clean or filtered water, and the filter-case is filled with clean water before introducing the dirty or impure water to be filtered. A pressure-gage $l'$ may be attached to the casing to indicate the water-pressure within.

The inlet $k$ for the unfiltered water or other liquid is disposed at the bottom of the casing A, or if arranged at the top the pipe extends downward within the casing and is directed to impinge upon the plate $e$, so that the incoming rush of liquid rises and carries the filtering-earth particles upon the cloth jacket $h$ of the filtering-cylinders $g$, jams the filtering-earths into the interstices of the cloth, and covers it with a smooth even surface of filtering material, the surface and molecular attraction of which arrest and retain all suspended matter, slimes, oil particles, or other filth contained in suspension in the liquid. The water or other liquid to be filtered, as shown by the arrows, passes through the filtering-cylinders into the annular chamber and into the perforated supporting-tubes $f$, which conduct the filtered water to the receiver $b$, from whence it can be drawn off through the pipe $l$ to the point of supply.

Oxidizing or deoxidizing chemical agents or elements—such as animal charcoal, alkaline permanganates, and the like—can be added, if desired, to the filtering-earth media.

A coating of filtering-earth of from one-thirty-second to one-sixteenth of an inch in thickness deposited upon the straining-cloth suffices for an effective filter-bed, which coating would require from one to two and one-half ounces of media, such as kieselguhr, for a cylinder thirty inches in length and two inches in diameter.

When the filter-bed becomes thoroughly coated with foul matter and requires cleansing, liquid will not pass through, so that the dirty state of the filter becomes at once apparent. An important feature of my improved apparatus consists in the ease with which the dirty filtering-cylinders can be removed, cleansed, sterilized, and replaced in the filter-casing. To effect this, the cover $a$ of the filter-casing A is removed, and by unscrewing the cap-nuts $i$ of the inner supporting-tubes $f$ the filter tubes or cylinders $g$ can be readily withdrawn. The straining-cloth $h$ can then be removed and thoroughly cleansed and sterilized by washing and boiling and be replaced in position, as before, upon the cylinder $g$. If desired, the filtering-cylinders may be cleansed *in situ* by a reversed current of air and filtered water. To effect this, air under pressure may be forced through the pipe $l$. The air and the filtered water in the receiver $b$ is thus forced into the interior of the supporting-tubes and through the filtering-cylinders, throwing off the dirty filter medium into the filter-case and out by way of a flush-pipe $m$, provided for this purpose. To assist the cleansing, I place a sheet of perforated metal $n$ above the filtering-cylinders and provide a water-pipe $o$ above this perforated metal plate. The water from the pipe $o$ is broken up into a shower by the perforations in the plate and falls upon the filtering-jackets. It will be understood that the foul filtering medium is thrown away and replaced by a fresh supply, which is deposited, as described, upon the straining-cloth jackets.

The number of filtering units employed may vary according to the volume of liquid to be filtered. In Fig. 3 I show in plan the internal arrangement of a small filter containing seven units only, which would be particularly suitable for filtering small volumes of liquid.

The improved apparatus is particularly applicable and economical in cases where a large number of filtering-cylinders are employed for the delivery of very large volumes of water. Moreover, by the arrangement of the plurality of filtering units, as shown, in one common pressure-proof casing an immense filtering area can be obtained in comparatively-small bulk.

The apparatus as described in addition to filtering water for domestic use is applicable for the filtration of water for a variety of purposes and is capable of filtering bright and clear condensed water from paper-makers' and calico-printers' drying-cylinders, and all such water, whether hot or cold, contaminated with oily particles from lubricants. In addition to the filtration of water, the apparatus is also applicable for filtering other liquids or beverages, such as beer and spirits.

In Fig. 6 I show a single filter-bed within a casing A applicable for use as a domestic filter. The inner drainage-tube $f$ is secured in position by means of nuts $p\ p$, resilient washers being employed, if necessary, to provide a fluid-tight joint. The outer cylinder $g$ is provided at each end with caps $g'\ g'$, bored for the passage of the inner tube $f$, while a cap-nut $i$ binds the outer tube $g$ in position. A modification in the method of securing the straining-cloth $h$ upon the cylinder $g$ is shown in this figure. The caps $g'\ g'$ are grooved and the straining-cloth $h$ secured thereto by means of a cord or elastic. The inlet-pipe is marked $q$, and the delivery of the filtered water is by way of the inner drainage-tube $f$, as shown by the arrows. The inlet-pipe $q$ and delivery-tube $f$ are provided with suitable taps or valves.

I declare that what I claim is—

1. A filter-bed consisting of an inner supporting and drainage tube, an outer perforated cylinder or tube, a space being left between the tubes for the free circulation of the fluid, the outer cylinder or tube being provided with a straining-jacket preferably of mercerized and unstretched cotton cambric, upon which is deposited a coating of filtering earth or media substantially as described and illustrated.

2. In a filtering apparatus, a casing, a plurality of filter-beds therein each comprising an inner supporting and draining tube and an outer perforated cylinder with a straining-jacket upon said cylinder composed of mercerized cotton having a coating of filtering-earth, and means for washing said filter-beds while in position, substantially as described.

In witness whereof I have hereunto set my hand in presence of two witnesses.

WILLIAM HENRY BARR.

Witnesses:
 JOSHUA ENTWISLE,
 WALTER HACKING.